United States Patent Office
2,864,708
Patented Dec. 16, 1958

2,864,708

COATED FOOD PRODUCT AND METHOD OF PRODUCING SAME

Wilke G. Tebbens, Riverside, Ill., assignor to Tee-Pak, Inc., a corporation of Illinois No Drawing. Application September 22, 1954
Serial No. 457,775

8 Claims. (Cl. 99—169)

This invention relates to the production of improved moisture-containing food products and more particularly, to a novel method of treating such foods as fruits, vegetables, meats and meat products to increase their storage life and enhance their eye appeal without injury to the esthetic or nutritive value thereof.

The effects of moisture loss on the quality and the appearance of vegetables, fruits, meats and the like are well known. However, besides the damage to esthetic factors associated with moisture loss, there is an important but not so obviously apparent economic factor also involved. For example, while moisture loss of a relatively inexpensive vegetable may not be of great moment, the problem is quite serious when the food products involved are expensive items such as dry sausage, which may sell at retail for $1.00 or $1.50 a pound. It can be seen that with such an item, moisture loss of even a few percent becomes a very important economic consideration to the manufacturer, retailer and the consumer as well.

In the past, the treatment of food products to improve their eye appeal and their shelf-life has included such expedients as wrapping the food products in sheet material of one kind or another, such as cellophane, rubber hydrochloride (Pliofilm), polyvinylidine chloride (saran), and other plastic film materials, enclosing the food in bags or tubes of various film materials, or dipping the food products into various kinds of more or less moisture impervious materials including tars, waxes, modified gelatine, and resin compositions.

With none of the prior art products and techniques has it been possible to achieve completely satisfactory results. For example, the application to a piece of meat of a coating of tars, rubber hydrochloride, and similar materials which in film form eliminate a substantial part of the moisture loss, is otherwise unsatisfactory because in the case of meats and meat products particularly, sliming, molding, putrification, graying and other deleterious results accompany the moisture prevention achieved by these coatings.

Furthermore, with the coating products heretofore proposed, the eye appeal of the resulting treated food is greatly diminished due to the unattractive color and clarity characteristics of these coatings.

Another and extremely important factor involved in improving the storage characteristics of meat products particularly, has resided in the necessity to use coatings which result in the formation of a thick skin on the treated product, which required the use of prohibitively excessive (cost-wide) amounts of coating material.

Other disadvantages of the prior art techniques and products lie in the requirement that after application of the coating material to the food, the food had to be exposed to elevated temperatures for economically prohibitive periods of time, and required special equipment, heaters, extra storage space, and additional personnel to handle.

The problems involved in effecting a commercially important improvement in the storage characteristics of meat products particularly, are difficult and extremely complex due to the number and the variety of interdependent factors involved. Thus the problem is not simply one of eliminating or minimizing the evaporation of moisture from the food product, but involves also the maintenance, insofar as possible, of the original appearance of the food, the use of a coating material which is itself attractive, clear, inexpensive and compatible with the type of food treated, cost of the treatment, ease of application, and equipment and personnel requirements, just to mention a few.

The present invention is directed to a novel technique and method for treating food products which result in keeping moisture loss therefrom significantly low, while at the same time maintaining and even improving the original natural appearance of the treated product, these important results being achieved at a substantially low cost, combined with improved shelf-life of the treated product.

The invention is particularly applicable to the treatment of food products including root crops such as carrots and turnips; citrus fruits such as oranges, lemons, and limes; fresh meats; fresh sausage such as salami and bologna; dry sausage such as cervelat, summer sausage, hard salami and the like; smoked meat items like hams, butts, Canadian bacon, liver sausage, frankfurters, ring and stick bologna; and including food products, particularly meat products such as sausage, already enclosed in a casing including the conventional regenerated cellulose sausage casings; fibrous casings (consisting of regenerated cellulose reinforced with cellulosic fibers like paper or synthetic or natural fiber); natural casings, including beef, hog, goat and sheep casings; casings made from alginates; sealed or seamed parchment casings; and hide fleshing casings, such as Cutisin, Naturin, and Brechtin.

In general, the present invention involves the application of a coating to the food being treated, by dipping, brushing, spraying or the like, followed by a curing time, normally at ordinary room temperatures for a sufficient time to set the coating, usually of the order of ten minutes or even less.

The coating composition used in the practice of the present invention comprises a ternary or tertiary polymer composition, this being the product of polymerization of xinylidene chloride, vinyl chloride, and a lower alkyl acrylate, which components are selected from the range of preferable proportions listed below, the total being 100 parts on the solids basis of the latex:

Vinylidene chloride, about 70 to 85 parts;
Vinyl chloride, about 10 to 25 parts;
A lower alkyl ester of acrylic acid, such as methylacrylate and ethylacrylate, about 5 to 15 parts.

This ternary polymer composition may be prepared in accordance with the procedures described in U. S. Patent No. 2,651,626 and is conveniently used for the purposes of this invention in the form of an aqueous emulsion containing from about 20% to about 60% solids, preferably containing about 50% solids. In treating food products in accordance with our invention, an aqueous emulsion containing the preferable quantity of ternary polymer is contacted with the food to be treated, as by dipping or spraying.

The dipping, spraying or the like is done with the emulsion and the product treated being conveniently at ordinary room temperatures, and the dipped or sprayed product allowed to drain momentarily and then maintained at ordinary room temperatures until the coating is cured—usually a matter of about three to ten minutes. If desired, a food product such as sausage, may be dipped shortly after processing, and while still at an elevated temperature.

It is a feature of the present invention that the food product being treated can be, and preferably is, air cured (after being contacted with the ternary polymer composition) within a commercially practical short period of time without the necessity of exposure to elevated temperatures. It is another feature of our invention that the coating applied to the food is exceptionally thin, being of the order of about 0.5 to 2.0 mils, and that despite the thinness of the film, we obtain unexpectedly excellent moisture-loss characteristics combined with an outstanding shelf-life, and a surprisingly good resistance to fading, sliming and molding. We wish to point out further that the technique of our invention is particularly important commercially in that it permits the processor and producer of the food products to process such products in accordance with the present invention without unduly tying up equipment or personnel, and without the necessity for expensive ovens, furnaces, hot water baths, or other sources of heat, which are necessary to effect curing when other types of coatings are used.

Our invention will be described in detail in the following examples; it is to be understood that these are merely illustrative embodiments of particular forms of our invention and are not to be construed in a limiting sense. It is also to be understood of course, that modifications within the scope of the invention will suggest themselves to those skilled in the art, and accordingly it is intended that the scope of the invention be limited only by the disclosure and the appended claims.

Example 1

An aqueous emulsion containing 51% (solids basis) of a ternary polymer composition comprising the polymerization product of a mixture of 78 parts of vinylidene chloride, 16 parts of vinyl chloride, and 6 parts of methylacrylate, was placed in a dip tank. A number of Praski sausages (this is a type of salami encased in regenerated cellulose casing) were dipped in the emulsion at room temperature, removed from the dip tank and air dried at room temperature for ten minutes. The thickness of the coting resulting from the dip, after curing, was 1.5 mils. The sausages were then placed in a refrigerated open display case at a temperature of 42° F. and a relative humidity of 92%. The moisture vapor transmission in grams per square centimeter of exposed surface per 24 hours, as determined over a one week period, was found to be between 0.0018 and 0.0029.

The control sausage stored under the same conditions had a moisture vapor transmission of 0.027 grams per square centimeter of surface per 24 hours, and appeared shrivelled and dark, whereas the coated sausages retained their original color and bloom and showed no signs of shrivelling.

Example 2

A regenerated celulose-encased salami sausage, similar to those used in Example 1, was dipped and processed as in Example 1. A second sausage of the same type was dipped in a latex of the aforesaid ternary polymer having approximately 37% solids and processed similarly. A third salami was not dipped and was used as a control. All three sausages were stored under the conditions of Example 1 for fifteen days. The results of the storage test are shown in the following table:

| Sausage | Film Thickness, mils | Weight loss, percent | M. V. T., grams/ sq. cm./ 24 hrs. | Appearance |
| --- | --- | --- | --- | --- |
| Control | 0 | 13.85 | .016 | Dark and shrivelled. |
| 51% solids dip | 1.5 | 1.28 | .0016 | Fresh. |
| 37% solids dip | 1.0 | 1.46 | .0018 | Fresh. |

These data show the effectiveness of the coating in preserving the weight and appearance of the meat product.

Example 3

Sausage encased in regenerated cellulose casings were dipped repeatedly in the emulsion described in Example 1 to obtain thick films, air-cured at room temperature, about 75° F., for ten minutes, and the film thickness, moisture vapor transmission, and shelf-life characteristics were observed, with the following results:

| Sausage | Average Film Thickness, mils | M. V. T., grams/sq. cm./24 hrs. |
| --- | --- | --- |
| Batch No. 1 | 2.92 | 0.0014 |
| Batch No. 2 | 2.73 | 0.0015 |
| Batch No. 3 | 3.25 | 0.0012 |

A comparison of these results with those given in Example 2 shows that substantially similar M. V. T. rates were obtained with the thinner film as were obtained with the thicker more costly films.

Example 4

A salami sausage having a somewhat higher moisture content than the Praski sausages above described was dipped in the emulsion of Example 1 and then air cured at room temperature for fifteen minutes; the resulting film thickness was 1.5 mils and the moisture vapor transmission obtained was 0.0016, expressed in the units mentioned above.

With the same type of sausage treated so that the resulting film thickness was 1.0 mil, the moisture vapor transmission was 0.0020. The surface of the sausage remained fresh, attractive, and generally similar in appearance to the original untreated product.

Example 5

Sausages encased in a regenerated cellulose casing were dipped at room temperature in an aqueous emulsion (50% solids) of a latex consisting of 85% vinylidene chloride and 15% acrylonitrile, and containing a plasticizer, 2-ethyl hexyl diphenyl phosphate. One group was air cured at room temperature, and another was cured at 200° F. It was found that the air cured coating lacked flexibility and strength and consequently cracked and peeled during handling, storage, and shipping. The heat cured coating, on the other hand, exhibited satisfactory flexibility and strength, and in these properties, approximated the air-cured coatings made from the ternary compositions used in Examples 1–4.

On the other hand, both sausages coated with vinylidene chloride-acrylonitrile copolymer exhibited fading and loss of bloom within 24 hours after coating. The appearance of these sausages would be detrimental to the sale of the product—they had lost eye appeal. In contrast, the sausages of Examples 1–4 showed no fading or loss of blcom.

While it is essential that the coating composition used in the practice of our invention contain a ternary polymer composition of vinylidene chloride, vinyl chloride and a lower alkylacrylate, it is to be understood of course, that other materials may be added thereto as desired. For example, the above composition may also contain plasticizers, such as Santicizer 141 (2-ethyl hexyl diphenyl phosphate); dioctyl phthalate; glycerine; propylene glycol, and the like.

Thickening agents may also be used, including such common ones as carboxymethylcellulose and derivatives thereof, methyl cellulose, gums such as tragacanth, arabic, and the like, as well as algin and similar products.

If a colored product is desired, dyes may be added to the coating, these being preferably certified colors such as F. D. & C. Orange-2, F. D. & C. Red-32 or any other oil soluble or compatible certified colors.

Suspending agents may be added to the coating composition in order to keep the composition in suspension without settling out, thereby increasing the shelf-life of the coating product. Among the typical suspending agents which may be used are the rare earth, alkaline earth, and metallic soaps, resinates, modified resinates, abietates, quaternary ammonium compounds such as Triton, X-100, long chain sulfated alcohols and the like. Antimycotics an anti-molding agents may likewise be incorporated into the composition as for example, calcium and sodium propionates, sodium benzoate to mention a few. Anti-oxidant materials may form part of the composition and may be taken from the group represented by butylated hydroxyanisole, nordihydroguaiaretic acid and similar anti-oxidants, which have been approved for food use. We may also incorporate antibiotics such as penicillin, aureomycin, or salts thereof into the coating composition.

The coated food product can be decorated as by printing, flocking and the like, and the film as well as the polymer emulsion itself may be pigmented by the addition of titanium dioxide or similar opacifying agents and colored by iron oxide or other pigments.

If it is desired to strip off the coating "skin" from the treated product, as for example from a sausage encased in a casing whose ends are tied, a thin string can be extended between the end ties and prior to the coating operation so that after the coating is cured it may be "zippered" off if desired by moving the string by one end so that it cuts through the coating. Where the food item has been enclosed in a bag prior to dipping, it is to be understood of course, that the food-containing bag can also be dipped with the accompanying beneficial results hereinbefore described.

Besides the above-mentioned additives which can be incorporated into the coating composition, it may be also desirable in some instances to add wood smoke distillate and/or other odoriferous products thereto as desired.

Ultra-violet light screening agents and bronzing agents may also be added.

The present invention permits the production of moisture containing food products in a form such that they are characterized by having the combined properties of low moisture loss, surprising thinness, and clarity of coating, and resistance to deterioration such as fading, not possible with the techniques, methods and procedures heretofore used. Achievement of these combined characteristics together with the added advantage of effecting a rapid cure of the treated product at ordinary room temperatures is an additional and very important advantage of my invention.

I claim:

1. A moisture-containing food product encased in a coating which imparts to the packaged food product a high degree of resistance to moisture vapor loss, fading, shrinkage, and loss of bloom, said coating comprising a ternary polymer composition of vinylidene chloride, vinyl chloride and a lower alkyl acrylate selected from the range of proportions including vinylidene chloride, 70 to 85 parts, vinyl chloride, 10 to 25 parts, and a lower alkyl ester of acrylic acid, 5 to 15 parts.

2. The product of claim 1 wherein the coating has a thickness of from about 0.5 to about 2.0 mils.

3. The product of claim 1 wherein the acrylate ester is methylacrylate.

4. A meat product encased in a casing over which has been applied a coating composition which imparts to the packaged meat product a high degree of resistance to moisture vapor loss, fading, shrinkage, and loss of bloom, said coating composition comprising the polymerized reaction product of a ternary polymer composition of vinylidene chloride, 70 to 85 parts, vinyl chloride, 10 to 25 parts and a lower alkyl acrylate, 5 to 15 parts.

5. The product of claim 4 wherein the outer coating has a thickness of from about 0.5 to about 2.0 mils.

6. The product of claim 4 wherein the said first casing is selected from the group consisting of regenerated cellulose; regenerated cellulose reinforced with a member of the group selected from cellulosic fibers and other synthetic and natural fibers; natural casings; alginate casings; parchment casings; and hide fleshing casings.

7. A method of producing a packaged food product having a low degree of moisture vapor loss combined with a high degree of resistance to fading shrinkage, and loss of bloom which comprises contacting the food product with an aqueous emulsion comprising a ternary polymer composition composed of vinylidene chloride, 70 to 85 parts, vinyl chloride, 10 to 25 parts and a lower alkyl ester of acrylic acid, 5 to 15 parts, said emulsion containing from about 20 to 60% solids, and curing the thus treated food product at room temperature so that a film having a thickness of about 0.5 to about 2.0 mils results.

8. The method of claim 7 wherein the said ester is the methyl ester.

References Cited in the file of this patent

UNITED STATES PATENTS

| | | |
|---|---|---|
| 2,563,079 | Smith | Aug. 7, 1951 |
| 2,570,478 | Pitzl | Oct. 9, 1951 |
| 2,611,708 | Owens et al. | Sept. 23, 1952 |
| 2,651,626 | De Nie | Sept. 8, 1953 |